(12) United States Patent
Goulden et al.

(10) Patent No.: US 7,401,140 B2
(45) Date of Patent: Jul. 15, 2008

(54) GENERATION OF STATISTICAL INFORMATION IN A COMPUTER NETWORK

(75) Inventors: David L. Goulden, Redwood City, CA (US); Dominic Bennett, Los Altos, CA (US)

(73) Assignee: Claria Corporation, Redwood City, CA (US)

( * ) Notice: Subject to any disclaimer, the term of this patent is extended or adjusted under 35 U.S.C. 154(b) by 782 days.

(21) Appl. No.: 10/464,419

(22) Filed: Jun. 17, 2003

(65) Prior Publication Data
US 2004/0260744 A1 Dec. 23, 2004

(51) Int. Cl.
*G06F 15/16* (2006.01)
*G06Q 30/00* (2006.01)

(52) U.S. Cl. .......................... 709/224; 709/217; 705/26

(58) Field of Classification Search ................. 709/203, 709/217, 232, 224, 226; 705/14, 26, 1
See application file for complete search history.

(56) References Cited

U.S. PATENT DOCUMENTS

| | | | |
|---|---|---|---|
| 5,948,061 A | | 9/1999 | Merriman et al. |
| 6,393,407 B1 * | | 5/2002 | Middleton et al. ............ 705/14 |
| 6,421,675 B1 | | 7/2002 | Ryan et al. |
| 6,438,578 B1 * | | 8/2002 | Schmid et al. .............. 709/203 |
| 6,466,970 B1 * | | 10/2002 | Lee et al. .................... 709/217 |
| 6,513,060 B1 * | | 1/2003 | Nixon et al. ................ 709/203 |
| 6,601,100 B2 * | | 7/2003 | Lee et al. .................... 709/226 |
| 6,721,795 B1 * | | 4/2004 | Eldreth ....................... 709/232 |
| 6,785,723 B1 * | | 8/2004 | Genty et al. ................ 709/224 |
| 2002/0116494 A1 * | | 8/2002 | Kocol ......................... 709/224 |
| 2002/0128925 A1 * | | 9/2002 | Angeles ....................... 705/26 |
| 2003/0033155 A1 * | | 2/2003 | Peerson et al. ................. 705/1 |
| 2004/0078294 A1 * | | 4/2004 | Rollins et al. ................. 705/27 |

OTHER PUBLICATIONS www.conversionruler.com/faq.php, Feb. 4, 2003.*
DoubleClick products (17 total pgs); Webpage [online] [retrieved on Jun. 11, 2003]; Retrieved from the Internet: <URL: http://www.doubleclick.com>.
PCT International Search Report for Application No. PCT/US04/09918 (2 sheets).

* cited by examiner

*Primary Examiner*—Jungwon Chang
(74) *Attorney, Agent, or Firm*—Haynes, Beffel & Wolfeld LLP (57) ABSTRACT

In one embodiment, statistical information is generated in a computer network by detecting reception of documents in a client computer. A server computer is notified of the reception of the documents to allow the server computer to generate statistical information indicative of the effectiveness of an advertising campaign. The documents may comprise web pages, while the computer network may comprise the Internet.

10 Claims, 8 Drawing Sheets

GENERATION OF STATISTICAL INFORMATION IN A COMPUTER NETWORK

BACKGROUND OF THE INVENTION

1. Field of the Invention

The present invention relates generally to computer systems, and more particularly but not exclusively to methods and apparatus for generating statistical information in a computer network.

2. Description of the Background Art

Large public computer networks, such as the Internet, allow advertisers to reach a worldwide audience twenty-four hours a day, seven days a week. This has made large public networks a cost-effective medium for marketing and selling products (e.g., goods and services). On the Internet, for example, advertising revenues allow companies to distribute free software or provide free access to websites. Needless to say, advertising helps fuel the Internet economy.

A company may advertise products in its own website. It may also advertise products in popular websites, such as search engines or portals. Regardless of whether a company chooses to run advertisements in its own or third-party website, an advertising campaign involves significant costs not just in running the campaign, but also in lost sales due to ineffective advertising. Thus, a technique for determining the efficacy of an advertising campaign is generally desirable.

SUMMARY

The present invention relates to methods, apparatus, and systems for generating statistical information in a computer network. The present invention may be employed. in a wide variety of data processing applications, including advertising on the Internet.

In one embodiment, statistical information is generated in a computer network by detecting reception of documents in a client computer. A server computer is notified of the reception of the documents to allow the server computer to generate statistical information indicative of the effectiveness of an advertising campaign. The documents may comprise web pages, while the computer network may comprise the Internet.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided such as examples of systems, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
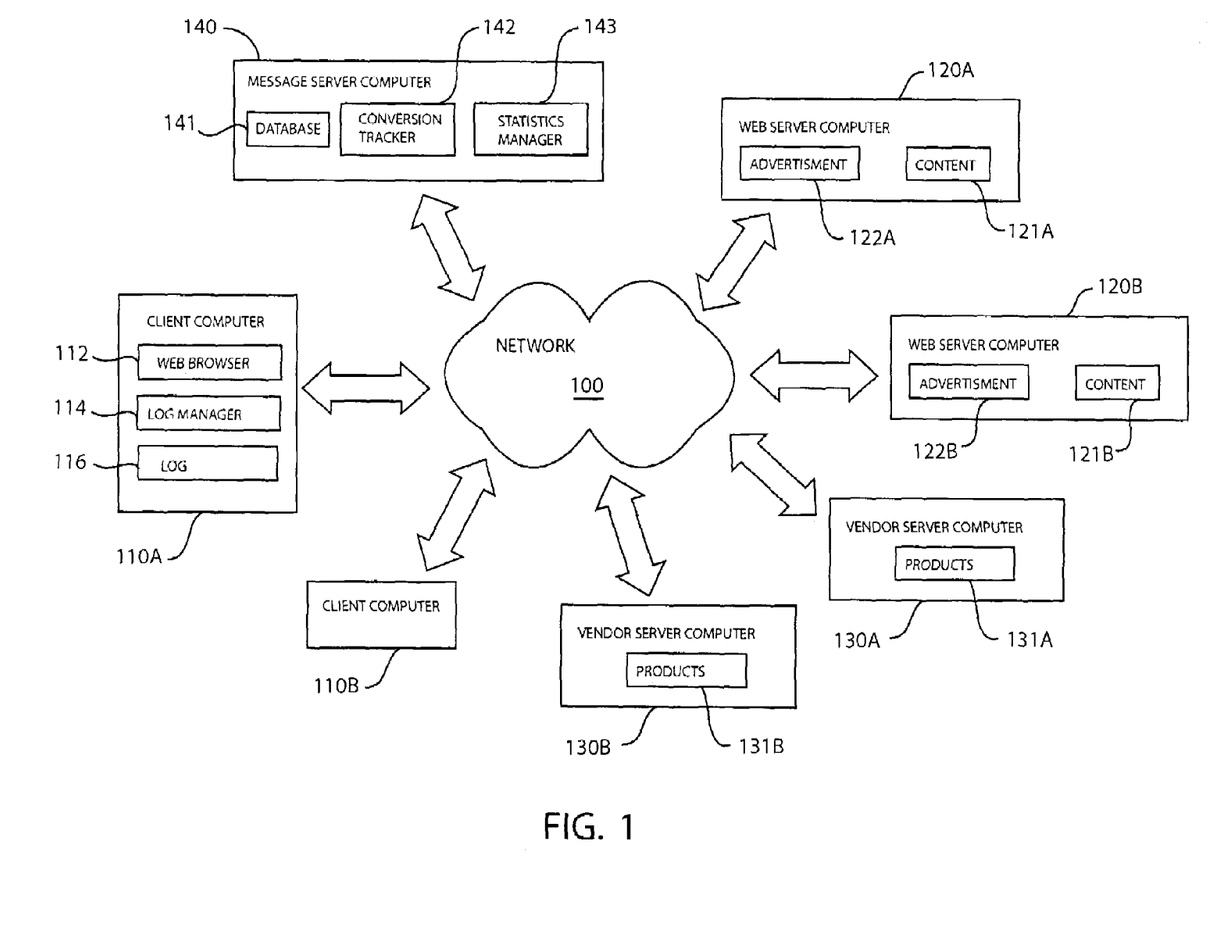
FIG. 1 shows a schematic diagram of a computer network 100 in accordance with an embodiment of the present invention.

FIG. 1 shows a schematic diagram of a computer network 100 in accordance with an embodiment of the present invention. Network 100 may include one or more client computers 110 (i.e., 110A, 110B, ... ), one or more web server computers 120 (i.e., 120A, 120B, ... ), one or more vendor server computers 130 (i.e., 130A, 130B, ... ), one or more message server computers 140, and other computers not shown. Intermediate nodes such as gateways, routers, bridges, Internet service provider networks, public-switched telephone networks, proxy servers, firewalls, and other network components are not shown in the interest of clarity. In the example of FIG. 1, network 100 includes the Internet. However, other types of computer networks may also be used. Computers may be coupled to network 100 using any type of connection without detracting from the merits of the present invention.

A client computer 110 is typically, but not necessarily, a personal computer such as those running the Microsoft Windows™ operating system, for example. A web server computer 120, a vendor server computer 130, and a message server computer 140 are typically, but not necessarily, server computers such as those available from Sun Microsystems, Hewlett-Packard, or International Business Machines. A client computer 110 and a server computer may communicate using client-server protocol. It is to be noted that as used in the present disclosure, the term "computer" includes any type of data processing device including personal digital assistants, digital telephones, wireless terminals, and the like.

An end-user may employ a suitably equipped client computer 110 to get on network 100 and access computers coupled thereto. For example, a client computer 110 may be used to request a web page from a web server computer 120, a vendor server computer 130, or a message server computer 140. In that case, the requested web page is downloaded to the client computer 110 for viewing by the end-user. For purposes of the present disclosure, "requesting a web page" has the same meaning as using a web browser to "navigate" to, "reach," "view," or "access" the web page. Those of ordinary skill in the art will understand the meaning of the just mentioned words as they are used in the context of the Internet.

FIG. 1 also shows relevant components of a client computer 110, a web server. computer 120, a vendor server computer 130, and a message server computer 140. As can be appreciated, components in the present disclosure, such as those shown in FIGS. 1, 2, and 3, may be implemented in hardware, software, or a combination of hardware and software (e.g., firmware). Software components may be in the form of computer-readable program code stored in a computer-readable storage medium such as memory, mass storage device, or removable storage device. For example, a computer-readable medium may comprise computer-readable code for performing the function of a particular component. Likewise, computer memory may be configured to include one or more components, which may then be run by a microprocessor. Components may be implemented separately in multiple modules or together in a single module.

A client computer 110 may include a web browser 112, a log manager 114, and a log 116. Web browser 112 may be a commercially available web browser or web client. In one embodiment, web browser 112 comprises the Microsoft Internet Explorer™ web browser.

Log manager 114 may comprise computer-readable program code for monitoring the browsing activity of an end-user on a client computer 110, and for creating and maintaining log 116. In one embodiment, log manager 114 monitors web browser 112 for end-user browsing activities, such as when an end-user clicks on an advertisement or when the end-user navigates to a particular website. It is to be noted that the mechanics of monitoring an end-user's browsing activity, such as determining where an end-user is navigating to, what an end-user is typing on a web page, when an end-user activates a mouse or keyboard, and the like, is, in general, known in the art and not further described here. For example, log manager 114 may learn of end-user browsing activities by receiving event notifications from web browser 112.

In one embodiment, log manager 114 is triggered to update log 116 whenever an end-user navigates to a particular website or domain, receives a particular web page, or interacts with a portion of a web page (e.g., uses a mouse to click on an advertisement). For example, a list of addressing information, such as a list of domain names or uniform resource locators (URLs), may be received by a client computer 110 from message server computer 140. Log manager 114 may consult that list to determine whether or not to update log 116. As a specific example, log manager 114 may be triggered to update log 116 when the end-user navigates to a web page with the URL "http://www.traveltime.com/cheapvacations.html" or when the end-user clicks on an advertisement that links to a web page with a URL containing "traveltime" (e.g., "hftp://www.traveltime.com/code&EAB35h").

Log 116 may comprise a file or data structure. In one embodiment, log manager 114 employs log 116 to record triggering events. For example, log manager 114 may update log 116 to include a log entry indicating that an end-user navigated to a web page in the domain "traveltime.com." The log entry may include a timestamp indicating when the end-user navigated to a traveltime.com web page. In one embodiment, the end-user is identified using an anonymous machine identifier ("machine ID") assigned to the end-user's client computer 110, instead of personal identifiable information. This protects the end-user's privacy. Log 116 may be periodically provided to a message server computer 140, where log 116 is processed for the purpose of generating statistical information. For example, log manager 114 may provide log 116 to a message server computer 140 every twenty-four hours.

Techniques for monitoring for triggering events and end-user browsing activities are also disclosed in commonly-assigned U.S. application Ser. No. 10/152,204, filed on May 21, 2002 by Scott G. Eagle, David L. Goulden, Anthony G. Martin, and Eugene A. Veteska, which is incorporated herein by reference in its entirety. For example, the message delivery program disclosed in the just mentioned application may be used to look for particular URLs and report them to a message server computer for processing.

Still referring to FIG. 1, a web servercomputer 120 may include a content 121 (i.e., 121A, 121B, . . . ) and an advertisement 122 (i.e., 122A, 122B, . . . ). A content 121 may include, without limitation, information to be displayed on a computer screen, text, graphics, pictures, audio to be played, search result or pointers to web page containing search results, computer-readable program code (e.g., Java applet, script, HTML, hyperlink), and other types of information accessible over the Internet. A content 121 may be in a document, such as a web page. For example, a content 121 may comprise news provided in a web page. A web server computer 120 attracts traffic by providing a content 121 that may be of interest to its target audience.

An advertisement 122 may contain information relating to products (i.e., goods and services), such as cars, websites, movies, stores, job openings, streaming videos, on-line databases, video games, hotels, rental cars, vacation packages, watches, etc. It should be understood, however, that an advertisement 122 may be any type of impression presented in a computer screen, and does not have to be commercial in nature. For example, an advertisement 122 may also be related to an election (e.g., "vote for Mr. Candidate"), a warning ("flash floods in California, click here for more info"), and other non-product related information.

An advertisement 122 may be displayed in a pop-up, pop-under, banner, slider, and other types of presentation vehicles. An advertisement 122 may be included as part of a content 121. For example, a search result may contain links to vendor websites. In other words, an end-user performing an "Internet search" for "cars" may be provided a search result containing a link to a car manufacturer or dealer. Advertisement 122 may be displayed as part of a web page or in a separate window (e.g., pop-up or pop-under). A web server computer 120 may generate revenue by providing advertisements 122 along with web pages provided to client computers 110. For example, the entity (e.g., corporation or individual) operating a web server computer 120 may charge for each impression of an advertisement 122 or for each end-user interacting with an advertisement 122 (also known as "per click rate").

A vendor server computer 130 may be a website offering or containing information about products 131 (i.e., 131A, 131B, . . . ). Products 131 may be goods or services. A product 131 may be advertised in an advertisement 122. For example, a product 131A may comprise a book, while a vendor server computer 130A may be an on-line bookstore. An advertisement 122A for the book may be placed in web server computer 120A, which may be an Internet portal. End-users browsing on web server computer 120A may click on advertisement 122A to be directed to a web page of vendor server computer 130A (also known as a "landing page"). In vendor server computer 130A, an end-user may complete the purchase of the book by placing the book in an electronic shopping cart, proceeding to check-out, and then getting a web page confirming the purchase (also known as a "confirmation page").

There may be several levels of redirection between an advertisement 122 and a vendor server computer 130. For example, advertisement 122A may be a hyperlink to vendor server computer 130A, with the hyperlink being a line item in a search result generated by a server computer other than web server computer 120A. Specifically, the operator of vendor server computer 130A may contract with the operator of a search server computer (not shown) to display impressions of a product 131A to end-users performing an Internet search using the keyword "books." The operator of the search server computer, in turn, may contract with the operator of web server computer 120A to provide search results to end-users using web server computer 120A as a search engine. Thus, when an end-user employs web server computer 120A to search for "books," web server computer 120A may pass the keyword "books" to the search server computer. The search server computer may then serve a search result to a web page received by the end-user from web server computer 120A. One of the line items in the just mentioned search result may be a hyperlink to a landing page in vendor server computer 130A.

Techniques for delivering advertisements based on keyword searches are also disclosed in commonly-assigned U.S. application Ser. No. 10/289,123, filed on Nov. 5, 2002 by Eugene A. Veteska, David L. Goulden, and Anthony G. Martin, which is incorporated herein by reference in its entirety.

Still referring to FIG. 1, a message server computer 140 may comprise a database 141, a conversion tracker 142, and a statistics manager 143.

Database 141 may be a commercially available database software, such as those available from the Oracle Corporation of Redwood City, Calif. As will be later explained in connection with FIG. 3, database 141 may include a translation table for storing a sequence of steps (also referred to as "conversion steps") an end-user undertakes to convert an interaction with an impression. For example, the translation table may store a sequence of web pages that an end-user navigates through to convert a clicking of an advertisement into a purchase. Database 141 may also include additional tables for decoding page identifiers (e.g., URL), and for storing statistical and tracking related information.

Conversion tracker 142 may comprise computer-readable program code for determining if an end-user has converted an interaction with an impression, and for decoding page identifiers. Conversion tracker 142 may employ database 141 for storage and retrieval of conversion steps and tracking related information. Conversion tracker 142 may be implemented in or separately from database 141.

Statistics manager 143 may comprise computer-readable program code for generating statistical information. Examples of statistical information that may be generated by statistics manager 143 include, without limitation, pages viewed or not viewed by end-users, percentage of end-users that converted an interaction with an advertisement into a purchase, number of interactions with a particular advertisement displayed in a particular website, number of times an advertisement is displayed, click through rate of an advertisement, etc. Statistics manager 143 may generate statistical information based on a log 116 received from a client computer 110, data from conversion tracker 142, and/or auxiliary data received from other sources (e.g., a vendor server computer 130).

Figure 2:
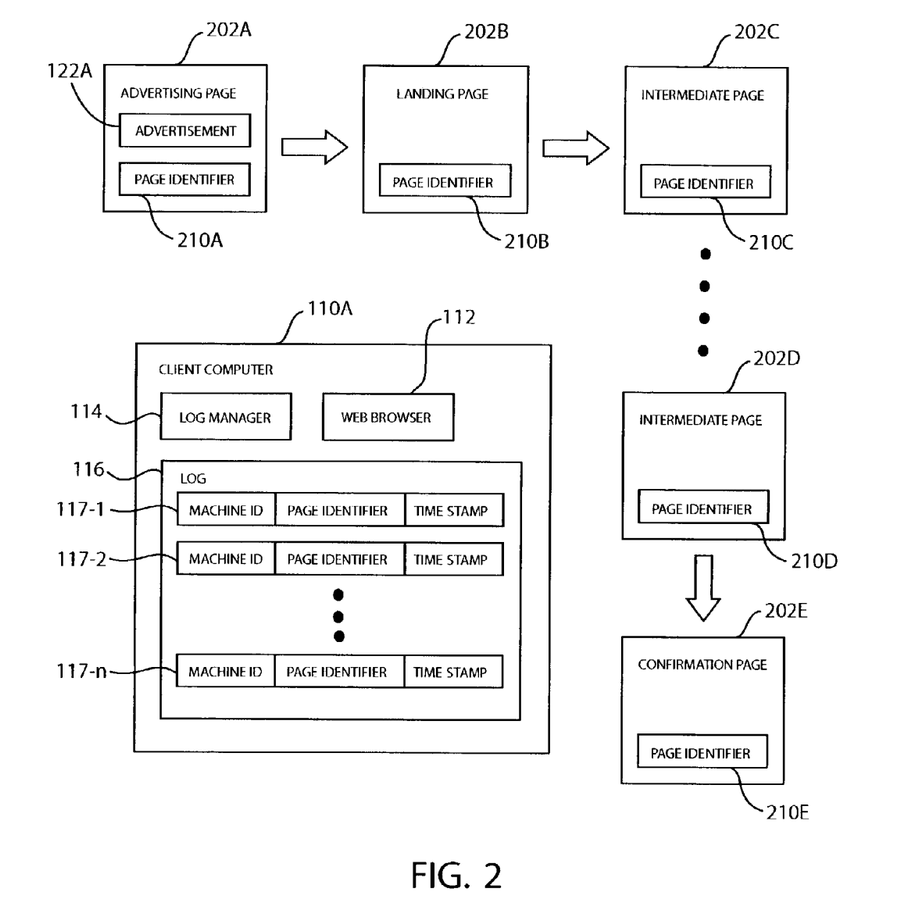
FIG. 2 schematically illustrates the operation of a client computer in accordance with an embodiment of the present invention.

FIG. 2 schematically illustrates the operation of a client computer 110 in accordance with an embodiment of the present invention. In one embodiment, pages 202 (i.e., 202A, 202B . . . ) comprise web pages. However, pages 202 may also comprise other types of documents, files, information, or data accessible over a computer network.

In the example of FIG. 2, advertising page 202A is a web page of web server computer 120A. Advertising page 202A may include advertisement 122A and a page identifier 210A. Advertising page 202A may be a web page containing general information, such as news or maps, or a search result. In the former case, advertisement 122A may be a banner or pop-up advertising for a product. In the case where advertising page 202A is a search result, advertisement 122A may be a hyperlinked line item in the search result.

A page identifier 210 (i.e., 210A, 210B, . . . ) serves as an identifying information for a document. For example, a page identifier 210 may comprise a URL of a web page. That is, page identifier 210A may comprise the URL of advertising page 202A, page identifier 210B may comprise the URL of landing page 202B, and so on. As can be appreciated, a page identifier is not limited to URLs or other addressing information. For example, a page identifier 210 may also be a tag, a text, graphics, an object, or anything that can employed to identify a document.

In one embodiment, log manager 114 monitors the browsing activity of an end-user on a client computer 110, which is client computer 110A in this example. Log manager 114 may be configured to make a log entry 117 (i.e., 117-1, 117-2, . . . ) in log 116 whenever the end-user performs a triggering event, such as navigating to a particular web page or domain. For example, log manager 114 may be configured to make a log entry 117 whenever the end-user navigates to an advertising page 202A in the domain "traveltime.com."

In one embodiment, a log entry 117 includes a machine ID field, a page identifier field, and a time stamp field. Depending on the application, a log entry 117 may also have additional or less fields. In the example of FIG. 2, "machine ID" identifies client computer 110A, "page identifier" includes the URL of a web page, and "time stamp" indicates the time and date the log entry was made. As a specific example, upon receiving advertising page 202A in client computer 110A, log manager 114 may make a log entry 117-1 indicating that the end-user (identified by the machine ID) navigated to advertising page 202A (identified by the page identifier) at a particular date and time (indicated in the time stamp). Log manager 114 may make a log entry 117 based on its monitoring of web browser 112. For example, log manager 117 may monitor web browser 112 for end-user navigation to a web page having a page identifier 210A, 210B, 210C, 210D, or 210E.

Advertisement 122A may include a pointer to landing page 202B. For example, advertisement 122A may include a hyperlink to a web page having a page identifier 210B (which may be a URL). In that case, an end-user clicking on advertisement 122A will reach landing page 202B. Upon receiving landing page 202B in client computer 110A, log manager 114 may make a log entry 117-2 indicating that the end-user (identified by the machine ID) navigated to landing page 202B (identified by the page identifier) at a particular date and time (indicated in the time stamp). Log manager 114 makes similar log entries 117 upon receiving intermediate page 202C, intermediate page 202D, and confirmation page 202E in client computer 110A.

Landing page 202B, intermediate pages 202C and 202D, and confirmation page 202E are typically, but not necessarily, web pages in the same domain. In the example of FIG. 2, landing page 202B, intermediate pages 202C and 202D, and confirmation page 202E are in the domain associated with vendor server computer 130A (see FIG. 1). Landing page 202B is so named because it is the web page where the end-user "lands" after clicking on advertisement 122A.

Intermediate pages 202C and 202D represent intervening web pages between landing page 202B and confirmation page 202E. In the bookstore example, intermediate page 202C may be a web page for viewing the contents of an electronic shopping cart, while intermediate page 202D may be a web page for entering payment and shipping information.

Confirmation page 202E may be a web page confirming that a conversion has been made. Confirmation page 202E is typically, but not necessarily, the last step in a sequence of conversion steps. In the bookstore example, confirmation page 202E comprises a web page confirming the book has been purchased. Confirmation page 202E may show a confirmation number and other information relating to the purchase. The end-user may print confirmation page 202E as a hard-copy receipt.

As can be appreciated, the number of web pages after advertising page 202A may vary depending on the application. For example, landing page 202B and confirmation page 202E may be the same web page, thus obviating the need for intermediate pages and a separate confirmation page. As another example, there may be additional web pages between intermediate pages 202C and 202D.

Figure 3:
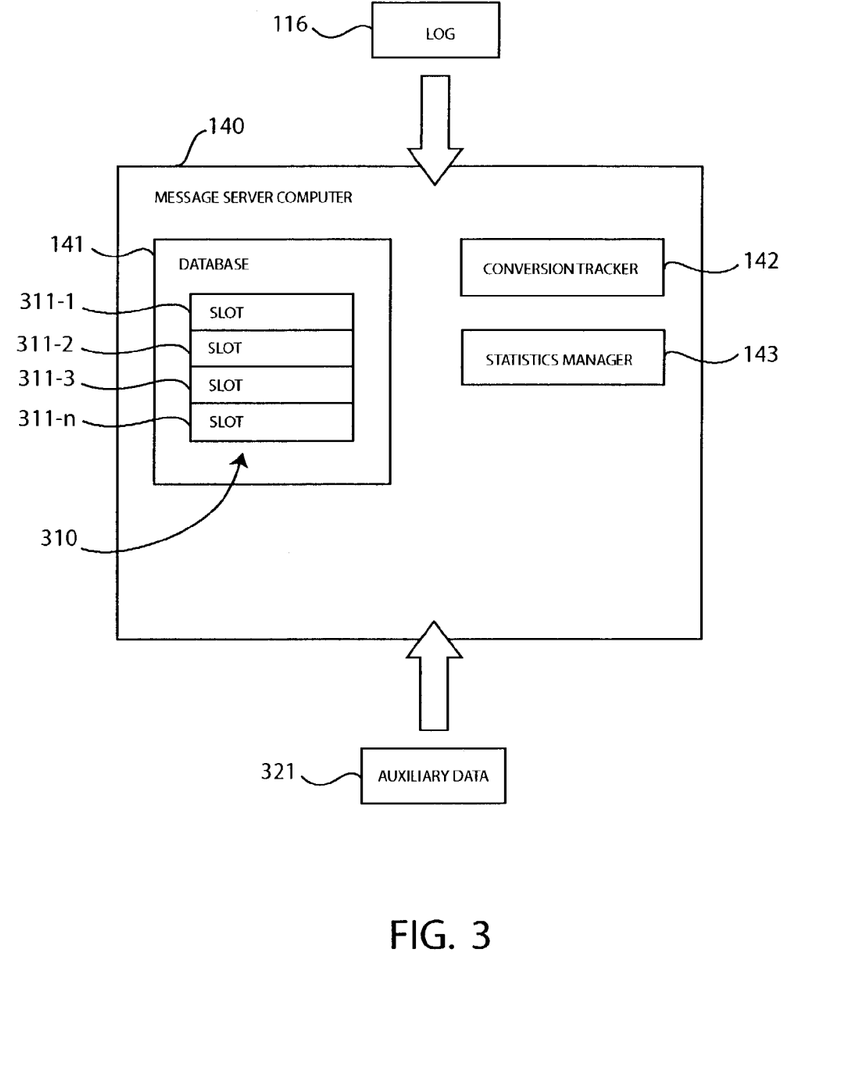
FIG. 3 schematically illustrates the operation of a message server computer in accordance with an embodiment of the present invention.

FIG. 3 schematically illustrates the operation of a message server computer 140 in accordance with an embodiment of the present invention. Database 141 in message server computer 140 may include a translation table 310. Translation table 310 may comprise slots 311 (i.e., 311-1, 311-2, . . . ) for each step in a sequence of conversion steps. That is, slot 311-1 may include information for the first step of a sequence of conversion steps, slot 311-2 may include information for the second step of the sequence of conversion steps, and so on. In one embodiment, the conversion steps comprise web pages, with each web page being referenced using its page identifier. For example, the steps of purchasing a book from vendor server computer 130A may include receiving landing page 202B and confirmation page 202E. In that example, slot 311-1 may indicate all or a portion of page identifier 210B, while slot 311-2 may indicate all or a portion of page identifier 210E. More specifically, slot 311-1 may contain the name of the html document of page 202B, and slot 311-2 may contain the name of the html document of page 202E. Note that database 141 may have several translation tables 310, one for each sequence of conversion steps.

In one embodiment, a page identifier 210 is coded such that it identifies the source of the traffic (i.e., the domain the end-user came from), the triggering event (i.e., the cause of the logging), and other information (e.g., keywords). For example, page identifier 210B may be a URL having the following format:

"bookstore.com/fiction.html/
source=searchnow&kw=best+seller"

In the above example, "bookstore.com" is the domain name associated with vendor server computer 130A, "fiction.html" is the name of the html file of landing page 202B, "searchnow" identifies the source of the traffic, which is web server computer 120A in this example, and "best+seller" indicates that the end-user received "fiction.html" as a result of clicking on a line item of a search result for the keywords "best" and "seller" (the triggering event). Of course, the coding of a page identifier will vary depending on the application.

Still referring to FIG. 3, message server computer 140 periodically receives a log 116 from a client computer 110. Conversion tracker 142 parses log entries 117 of received log 116. For each log entry 117, conversion tracker 142 determines the source of the traffic, triggering event, keywords, and other information coded in a page identifier. For each log entry 117, conversion tracker 142 also determines if and when the end-user on a client computer 110 has visited a web page listed in slots 311 of translation table 310. If the end-user has visited all web pages listed in all slots 311 of a translation table 310, conversion tracker 142 deems that a conversion has taken place (e.g., that an end-user converted the clicking of an advertisement into a purchase).

In one embodiment, conversion tracker 142 requires that each web page listed in slots 311 of translation table 310 be received in a client computer 110 in a specified order and within a certain amount of time to deem that a conversion has taken place. In other words, conversion tracker 142 may be configured to require an end-user to first receive a web page indicated in slot 311-1, followed by a web page indicated in slot 311-2, and so on. In addition, conversion tracker 142 may be configured to require the web page indicated in slot 311-2 be received within a certain amount of time after reception of the web page indicated in slots 311-1. As a specific example, conversion tracker 142 may be configured to require an end-user to reach landing page 202B, then intermediate page 202C, and then confirmation page 202E, in that order, within a 60-minute period. Conversion tracker 142 may determine when and in what order web pages were received in a client computer 110 from the time stamp of each log entry 117.

Statistics manager 143 generates statistical information based on log entries 117 and data from conversion tracker 142. Statistics manager 143 may generate statistical information regarding traffic from a particular web server computer 120, web pages reached or not reached by end-users, triggering events, conversions, click-throughs, and so on.

Statistics manager 143 may also generate statistical information based on auxiliary data 321. Auxiliary data 321 may be received from a vendor server computer 130. In one embodiment, auxiliary data 321 comprise information not readily available or derivable from a log 116. For example, auxiliary data 321 may include information relating to the total number of times an advertisement 122 has been displayed in a web server computer 120, the number of web server computers 120 contracted to display an advertisement 122, etc.

Figure 4:
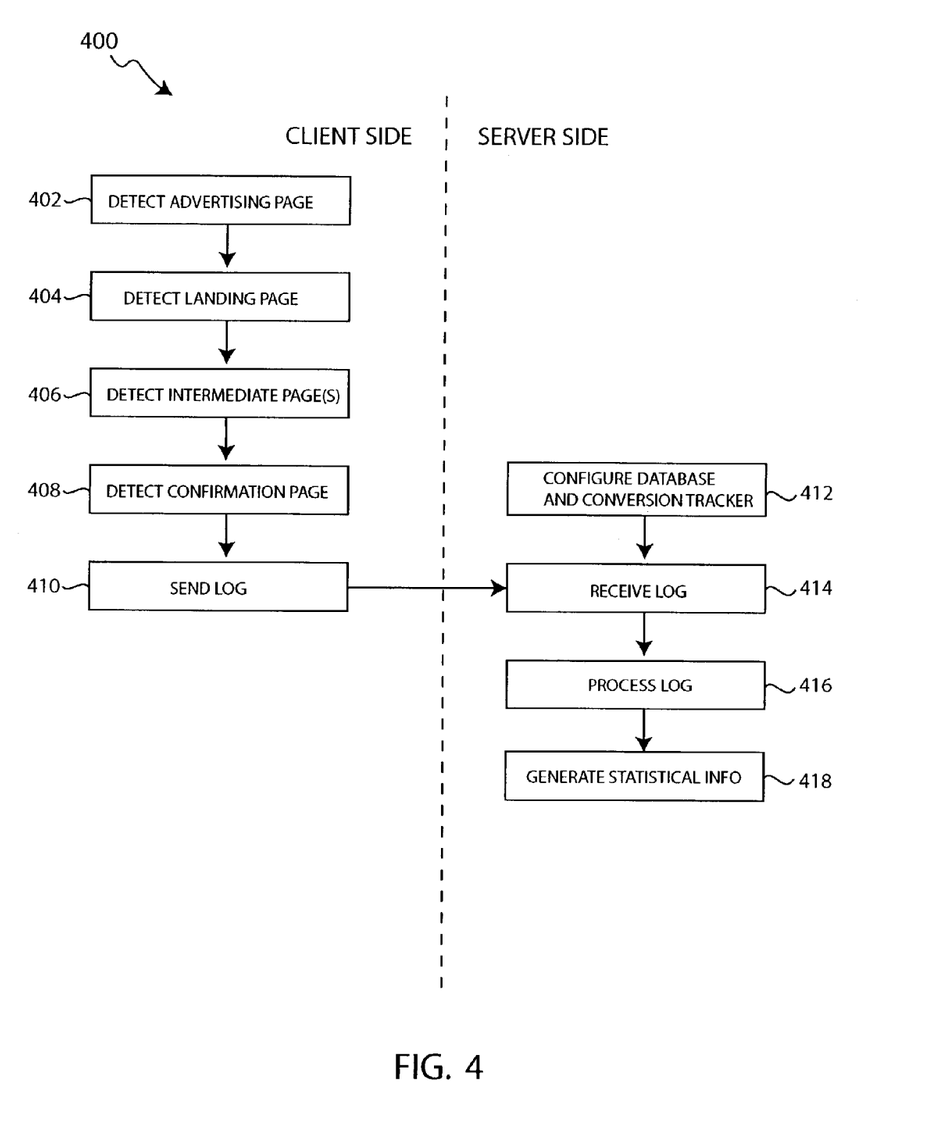
FIG. 4 shows a method of generating statistical information in a computer network in accordance with an embodiment of the present invention.

FIG. 4 shows a method 400 of generating statistical information in a computer network in accordance with an embodiment of the present invention. Method 400 will be described using network 100 shown in FIG. 1 as an example. It should be understood, however, that method 400 is not so limited and may also be implemented in other computer networks. In FIG. 4, steps performed in a client computer 110 are shown on the "client side", while steps performed in a message server computer 140 are shown on the "server side."

Beginning in step 402, log manager 114 detects reception of advertising page 202A in client computer 110A (see FIG. 2). Advertising page 202A may be received in client computer 110A when an end-user employs web browser 112 to navigate to web server computer 120A (see FIG. 1).

In steps 404, 406, and 408, log manager 114 similarly detects reception of landing page 202B, intermediate pages 202C and 202D, and confirmation page 210E in client computer 110A. It is to be noted that depending on the application, an end-user does not necessarily have to go through all of the aforementioned web pages to perform a conversion.

For each of steps 402, 404, 406, and 408, log manager 114 updates log 116 to indicate, among other information, the page identifiers of the received web pages and the time and date they were received.

In step 410, log 116 is provided to message server computer 140 (see FIG. 3).

In step 412, database 141 and conversion tracker 142 are configured to perform conversion tracking. Step 412 is further discussed in connection with FIGS. 5 and 6.

In step 414, log 116 is received in message server computer 140.

In step 416, conversion tracker 142 processes log 116.

In step 418, statistics manager 143 generates statistical information based on data from conversion tracker 142, log 116, and/or auxiliary data 321.

The present invention provides advantages heretofore unrealized. For one, embodiments of the present invention may be employed to advantageously determine the effectiveness of an advertising campaign. From statistical information generated by a statistics manager, the amount of traffic from a particular source may be determined. This allows a product vendor to spend more of its advertising budget on websites that produce the best results. The generated statistical information may also be employed to determine web pages reached or not reached by end-users, the drop-out rate between a landing page and a confirmation page, and other indicators of the effectiveness of an advertising campaign. In search results applications, the statistical information may be employed to optimize keywords.

The present invention also allows one entity to provide conversion tracking capabilities to multiple entities. For example, one entity, referred to as "the conversion tracking company," may operate a message server computer 140 and distribute log managers 114 to several client computers 110. The conversion tracking company may offer incentives, such as free software or on-line services, to end-users who download a log manager 114 to their client computers. The conversion tracking company may then offer conversion tracking services to other entities, referred to as "advertisers." The conversion tracking company may charge each advertiser for the conversion tracking service, thus spreading the cost of running and maintaining the service. Note that the conversion tracking company is uniquely positioned to provide the tracking service because it has client presence (e.g., log manager 114). This allows the conversion tracking company to monitor end-user browsing activities across several, separately operated websites. Thus, in contrast to server-based conversion tracking, embodiments of the present invention allow an advertiser to obtain conversion tracking capability without having to perform substantial modification to the advertiser's web site and without having to set-up its own conversion tracking infrastructure.

Figure 5:
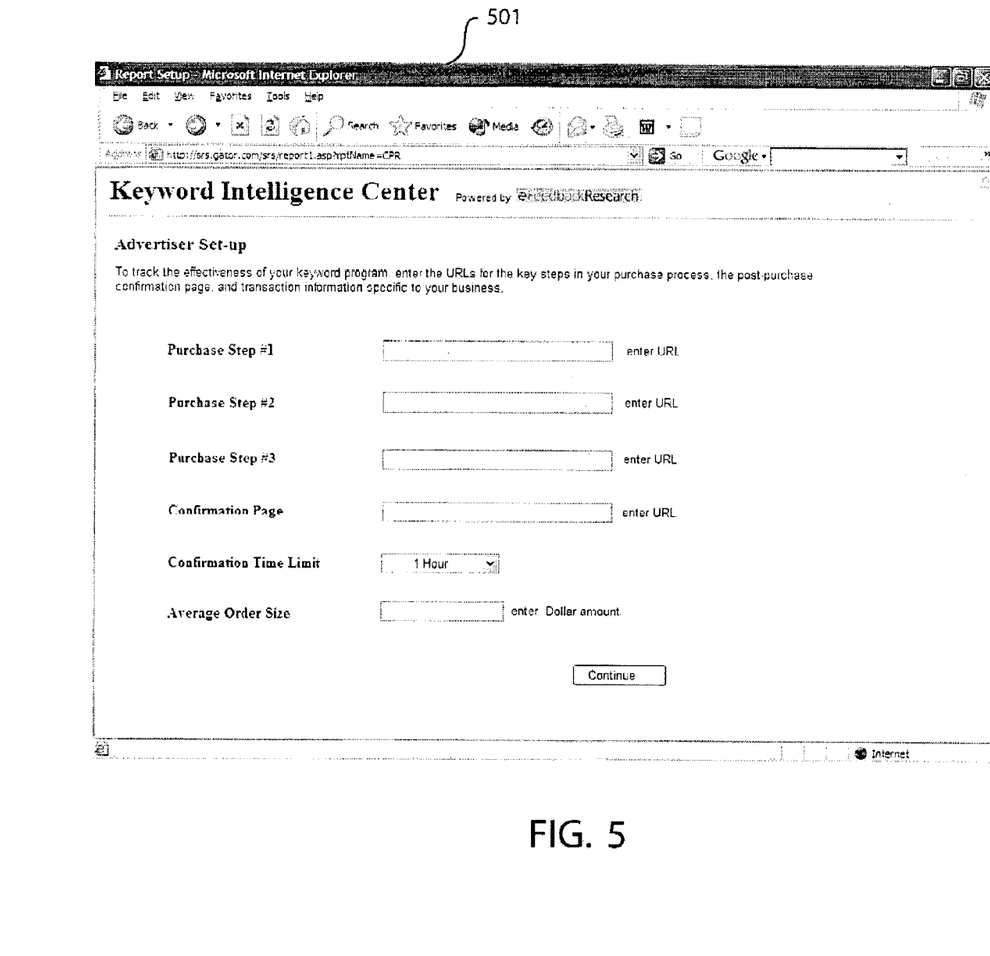
FIG. 5 shows a user interface for entering a sequence of conversion steps in accordance with an embodiment of the present invention.
Figure 6:
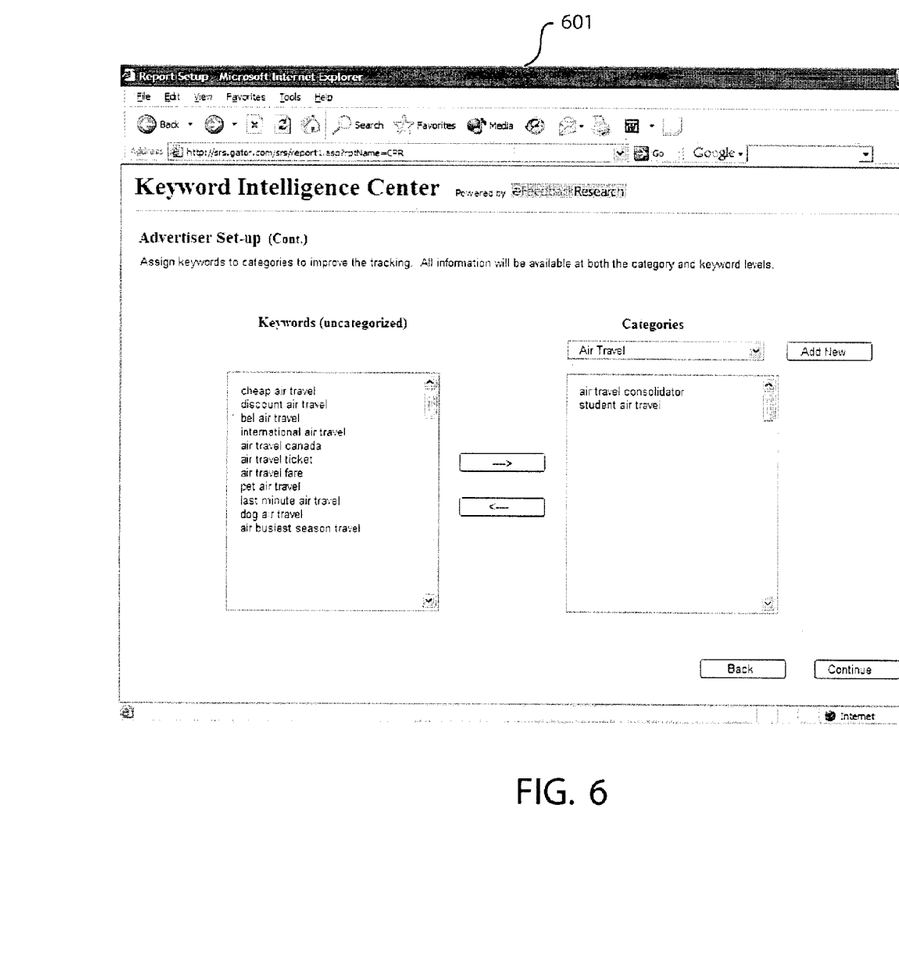
FIG. 6 shows a user interface for entering keywords that will be tracked in accordance with an embodiment of the present invention.

FIGS. 5 and 6 show sample screenshots of user interfaces for configuring a conversion tracker 142 and a database 141 in accordance with an embodiment of the present invention. In one embodiment, the screenshots shown in FIGS. 5 and 6 comprise web pages received from a message server computer 140. The user interfaces allow advertisers to configure a conversion tracking service over a computer network, such as the Internet. Data entered by advertisers in the user interfaces may be used to build a translation table 310, and to configure conversion tracker 142.

FIG. 5 shows a user interface 501 for entering a sequence of conversion steps. User interface 501 allows entry of the URL of web pages an end-user must navigate through to complete a purchase. The URL of a landing page, if any, may be entered in "Purchase Step #1," while the URL of a confirmation page may be entered in "Confirmation Page." The URLs of web pages between the landing page and the confirmation page may be entered in "Purchase Step #2" and "Purchase Step #3." Note that the advertiser does not have to enter the URL of a web page that is not necessary to the conversion process. The advertiser may also set a time limit for the conversion by choosing a time value in "Confirmation Time Limit."

FIG. 6 shows a user interface 601 for entering keywords that will be tracked. User interface 601 may be employed in applications where an advertisement is placed as a line item in a search result. With user interface 601, an advertiser may select keywords such as "cheap air travel", "discount air travel," and so on for tracking. User interface 601 also allows the advertiser to select keywords for certain "Categories." This gives the advertiser a better grouping of the keywords to be tracked.

Figure 7:
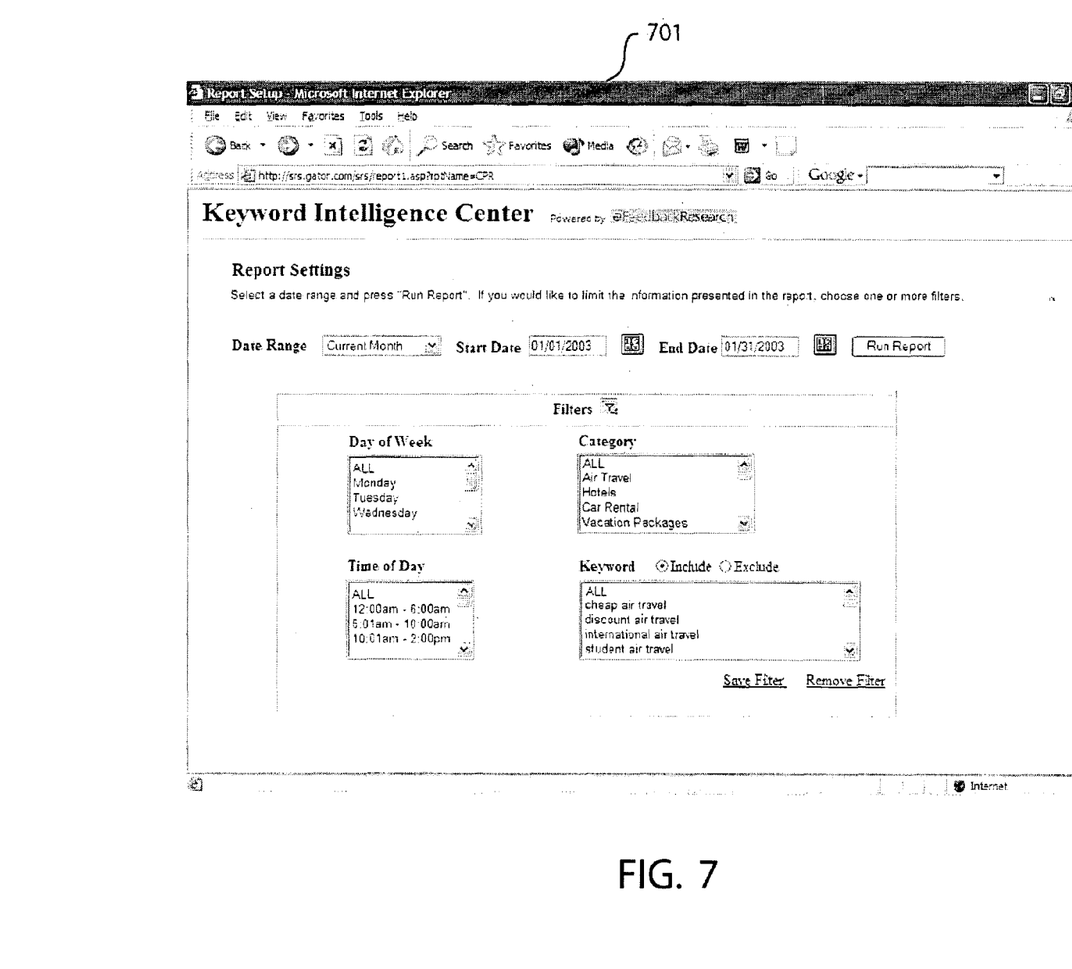
FIG. 7 shows a user interface for configuring a report in accordance with an embodiment of the present invention.
Figure 8:
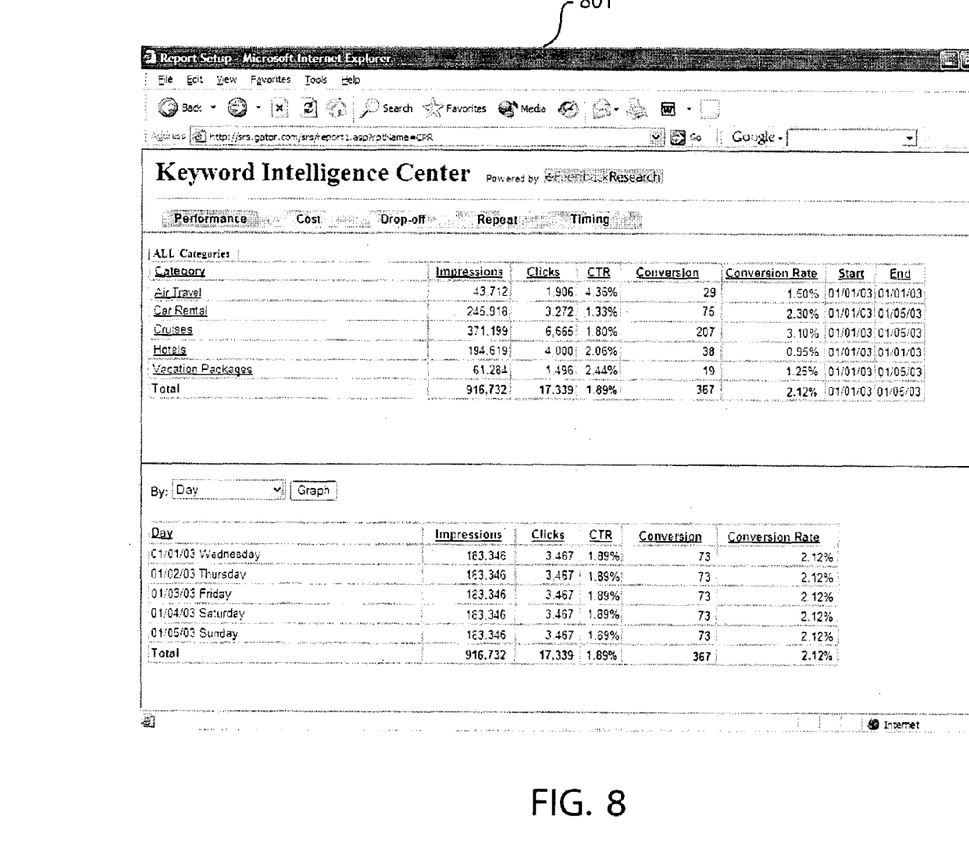
FIG. 8 shows a user interface for presenting a report in accordance with an embodiment of the present invention.

FIGS. 7 and 8 show sample screenshots of user interfaces for generating reports in accordance with an embodiment of the present invention. In one embodiment, the screenshots shown in FIGS. 7 and 8 comprise web pages received from a message server computer 140. The user interfaces allow advertisers to generate reports over a computer network, such as the Internet.

FIG. 7 shows a user interface 701 for configuring a report of statistical information generated by a statistics manager 143. The report may be run for a specified date range, day of the week, category, and keywords. As can be appreciated, the configuration and filters for a report will vary depending on the application.

FIG. 8 shows a user interface 801 for presenting a report. The report may be tabbed (e.g., "Performance," "Cost," . . . ) to allow an advertiser to select a particular section of the report for viewing. The report may include the number of times an advertisement was displayed ("Impressions"), number of clicks on the advertisement ("Clicks"), the click-through rate ("CTR"), and the conversion rate ("Conversion"). In the example of FIG. 8, keywords in the air travel category (e.g., "student air travel") were presented to end-users as part of search results 43,712 times, were clicked on 1,906 times, has a click through rate of 4.36%, has 29 conversions (i.e., 29 end-users who clicked on the search result item actually made a purchase), and has a conversion rate of 1.5%. For each category, the report may be for a date range or per day of the week.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of generating statistical information in a computer network, the method comprising:
   in a client computer, detecting a first identifying information associated with a first document, the first document being received in the client computer from a first web server computer in response to an end-user interaction with an impression from the first web server computer;
   forwarding data from the client computer to a server computer, the data including information about the detection of the first identifying information in the client computer;
   in the server computer, generating a statistical information based at least on the detection of the first identifying information in the client computer, the statistical information being indicative of an effectiveness of an advertising campaign that includes displaying of the impression from the first web server computer.

2. The method of claim 1 wherein the impression from the first web server computer comprises an advertisement on an Internet and the first document comprises a web page.

3. The method of claim 1 wherein the impression from the first web server computer comprises an advertisement, and wherein the statistical information indicates if the end-user made a purchase based on the advertisement.

4. The method of claim 1 wherein the first identifying information comprises addressing information.

5. The method of claim 1 further comprising:
   in the client computer, detecting a second identifying information associated with a second document received in the client computer from a second web server computer that is separately operated from the first web server computer; and
   wherein the data forwarded from the client computer to the server computer further includes information about the detection of the second identifying information in the client computer and wherein the statistical information is further based on the detection of the second identifying information.

6. The method of claim 5 wherein the statistical information indicates information regarding a number of end-users viewing the first document and the second document.

7. The method of claim 5 wherein the first identifying information and the second identifying information comprise a uniform resource locator (URL).

8. A method to be performed in a client computer, the method comprising:
- detecting navigation of a web browser to a first web page as a result of an end-user's interaction with an advertisement displayed in the client computer;
- detecting navigation of the web browser to a confirmation web page, the confirmation web page indicating that the end-user made a purchase based on the advertisement;
- maintaining a log of browsing activities in the client computer, the log of browsing activities including information about the detection of the navigation of the web browser to the first web page and the confirmation page; and
- forwarding the log from the client computer to a server computer for purposes of generating a statistical information relating to an advertising campaign.

9. A client computer in a computer network, the client computer having memory comprising:
- computer-readable program code in the client computer for detecting reception of a first web page as a result of an end-user interaction with an advertisement; and
- computer-readable program code in the client computer for detecting reception of a confirmation web page, the confirmation web page indicating that the end-user made a purchase based on the advertisement; and
- computer-readable program code in the client computer for informing a server computer of the reception of the first web page for purposes of generating a statistical information.

10. The method of claim 9 further comprising:
- computer-readable program code in the client computer for informing the server computer of the reception of the confirmation web page for purposes of generating a statistical information.

* * * * *